J. LORENZ.
VEHICLE TIRE.
APPLICATION FILED FEB. 15, 1917.

1,301,467.

Patented Apr. 22, 1919.

Witnesses
Paul A. Viesen
E. T. Jacker

Inventor
J. Lorenz
H. J. Sanders
By
Atty.

UNITED STATES PATENT OFFICE.

JOHN LORENZ, OF MILWAUKEE, WISCONSIN.

VEHICLE-TIRE.

1,301,467.   Specification of Letters Patent.   Patented Apr. 22, 1919.

Application filed February 15, 1917. Serial No. 148,847.

*To all whom it may concern:*

Be it known that I, JOHN LORENZ, a citizen of the United States, residing at Milwaukee, in the county of Milwaukee and State of Wisconsin, have invented certain new and useful Improvements in Vehicle-Tires, of which the following is a specification.

This invention relates to improvements in vehicle tires. One object is to provide a tire which will have all the resiliency of the present pneumatic tire and which will be more durable and cheaper to manufacture, puncture proof and blow-out proof. A further object is to provide a tire having a substantially indestructible body provided with a removable tread which tread, when worn, may be readily repaired or replaced by a new one leaving the tire in prime condition. A further object is to provide a tire which may be readily applied to any type of wheel provided with a demountable rim and as readily removed.

With the foregoing and other objects in view the invention consists in the combination and arrangement of parts to be hereinafter fully described, pointed out in the appended claims and illustrated in the accompanying drawing which forms a part of this specification and in which—

Like reference characters denote corresponding parts in both views.

Figure 1:
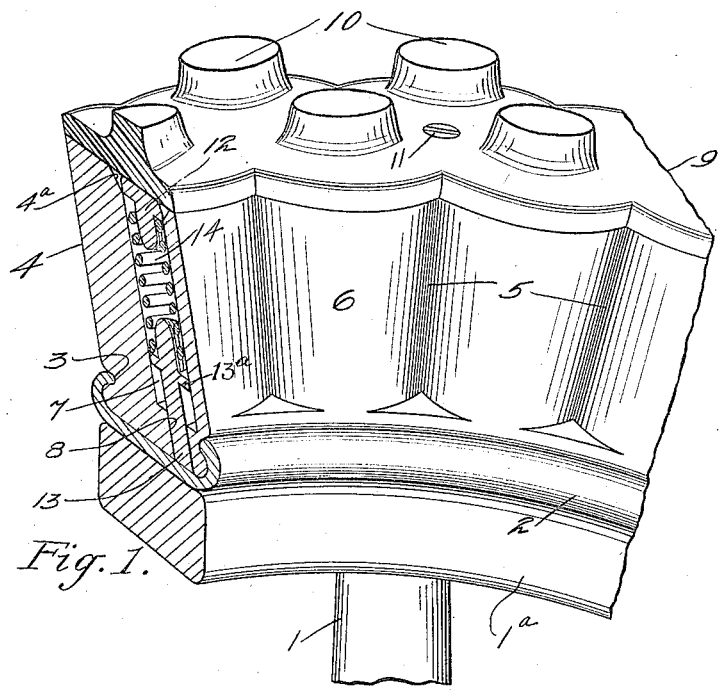
Figure 1 is a fragmentary perspective view of my tire, partly in section, showing its application.
Figure 2:
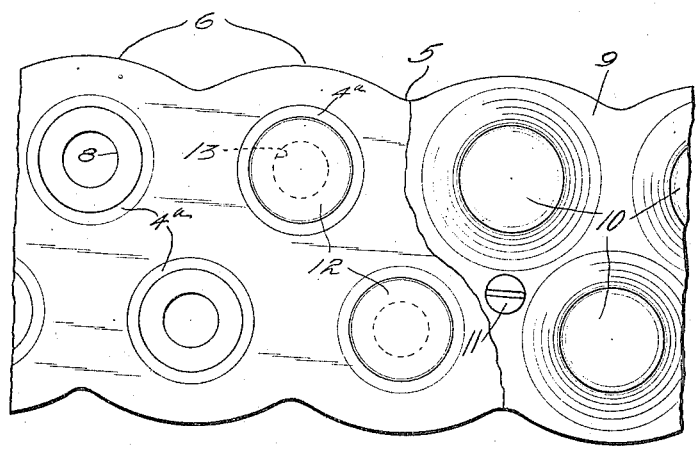
Fig. 2 is a top plan view of Fig. 1 but with part of the tread removed.

The spokes 1 of the wheel are secured to felly $1^a$ which carries the ordinary demountable rim 2, the edges of said rim 2 being disposed in the grooved portions 3 of the base or body 4 of my tire. The grooved portions 3 extend longitudinally of the body portion of the tire. The lateral surfaces of the body portion are preferably formed with a plurality of radially extending grooves 5 which divide it into a plurality of lateral rounded faces 6. The body portion of the tire is formed between each of its obliquely opposite lateral faces 6 preferably with two substantially cylindrical cavities 7. Perforations 8 of smaller diameter than said cavities communicate with the inner ends of the same from the inner or rim-engaged face of said body portion.

A hard rubber tread 9 formed with a plurality of protuberances 10 is secured by screws 11 to said body portion, the protuberances in said tread being so formed as to be disposed directly over the several cavities 7. The body portion 4 which is formed of metal or papier mâché is beveled at $4^a$ at the mouth of each cavity 7. The said beveled portions permit a relative movement of the tread in passing over rough roads and facilitate the operation of the shock absorbing mechanism now to be described. In each cavity 7 I provide a floating button 12 and a plug 13, said members being spaced apart by an expansion spring 14 which encircles the stem of said button and the adjacent or outer end of the plug 13 and bears directly upon the cross piece $13^a$, or shoulder, of the said plug and against the head of the button, the lower or inner end of said plug being disposed in the perforation 8. When the body portion 4 of the tire is placed in engagement with the rim the latter member forces the plug into the tire cavity thus compressing spring 14 and raising the shoulder $13^a$ above the inner termination of the cavity 7. The shock incident to travel over rough roads will be absorbed by the spring 14. When a tread 9 is worn the protuberances may be vulcanized on again or the tread may be readily replaced by a new one leaving the tire in the best of condition. In assembling the tire the body portion 4 is applied to the rim 2 before one edge thereof is curved or shaped. With the body portion 4 in position upon the rim the one straight edge thereof is pressed into engagement with one grooved portion 3.

What is claimed is:—

1. In a wheel tire, a longitudinally grooved body portion formed with a plurality of cavities extending inwardly from its outer face and with apertures extending into said cavities from its inner face, a tread removably secured to the outer face of said body portion, spaced protuberances formed upon portion, spaced protuberances formed upon said tread, and movable elements yieldingly spaced apart within said cavities and apertures, said elements having a bearing upon said tread and upon the rim of the wheel.

2. In a wheel tire, a longitudinally grooved body portion formed with a plurality of cavities extending inwardly from its outer face and with apertures extending into said cavities from its inner face, a tread removably secured to the outer face of said body portion, spaced protuberances formed upon said tread, buttons disposed in said cavities, plugs disposed in said cavities and apertures, and expansion springs connecting said buttons and plugs whereby they are yieldingly retained in engagement with said tread and wheel rim respectively.

3. In a wheel tire, a longitudinally grooved body portion formed with a plurality of cavities extending inwardly from one of its faces and with apertures extending into said cavities from its opposite face, a tread removably secured to the outer face of said body portion, protuberances formed on said tread, and shock absorbing means arranged in said cavities and apertures and having a direct bearing upon said tread and upon the rim of the wheel.

4. In a wheel tire, a body portion formed with longitudinal grooves and with radial grooves to divide said body portion into a plurality of lateral faces, said body portion being formed, further, with a plurality of cavities extending inwardly from its outer face and with apertures extending into said cavities from its inner face, a tread removably secured to the outer face of said body portion, protuberances formed upon said tread and disposed over the several cavities of said body portion, floating buttons disposed in said cavities, plugs disposed in said cavities and apertures, and expansion springs yieldingly separating said last named members whereby they are retained, respectively, in engagement with said tread and with the rim of the wheel.

In testimony that I claim the foregoing as my own I have hereto affixed my signature in the presence of two subscribing witnesses.

JOHN LORENZ.

Witnesses:
  NICHOLAS W. MARX.
  GUSTAVE PINSKE.

Copies of this patent may be obtained for five cents each, by addressing the "Commissioner of Patents, Washington, D. C."